United States Patent [19]

Gunter, Jr.

[11] 4,026,655

[45] May 31, 1977

[54] PSEUDO-BACKSCATTER LASER DOPPLER VELOCIMETER EMPLOYING ANTIPARALLEL-REFLECTOR IN THE FORWARD DIRECTION

[75] Inventor: William D. Gunter, Jr., San Jose, Calif.

[73] Assignee: The United States of America as represented by the Administrator of the National Aeronautics and Space Administration, Washington, D.C.

[22] Filed: May 27, 1976

[21] Appl. No.: 691,046

[52] U.S. Cl. .................................. 356/28; 250/574; 350/100; 350/102;

[51] Int. Cl.$^2$ .......................................... G01P 3/36

[58] Field of Search .................... 356/28; 250/574 350/100;102

[56] References Cited

UNITED STATES PATENTS

| | | | |
|---|---|---|---|
| 3,915,572 | 10/1975 | Orloff ................................ | 356/28 |
| 3,953,126 | 4/1976 | Kim et al. ........................... | 356/28 |
| 3,966,324 | 6/1976 | Iten .................................... | 356/28 |

OTHER PUBLICATIONS

Dandliker et al., *Applied Optics*, vol. 13, No. 2, 2-1974, pp. 286–290, 356–28.

*Primary Examiner*—Maynard R. Wilbur
*Assistant Examiner*—S. C. Buczinski
*Attorney, Agent, or Firm*—Darrell G. Brekke; John R. Manning

[57] ABSTRACT

A laser Doppler velocimeter for measuring the velocity of a flowing fluid comprising laser means for providing first and second beams of collimated coherent monochromatic electromagnetic radiation which are focused to intersect at a predetermined location in a flowing fluid, the movement of the particles of the fluid serving to scatter radiation in substantially all directions, the scattered radiation being shifted in frequency from that of the first beam by an amount corresponding to the velocity of the fluid at the predetermined location, a corner cube disposed generally forward of the predetermined location, the corner cube responding to a portion of the radiation scattered in the forward direction and being operative to reflect the portion in a direction substantially antiparallel to the forward direction, and a collector responsive to the frequency of the first beam and to the frequency of the reflected portion of radiation and operative to provide a frequency modulated signal representative of the velocity of the fluid at the predetermined location. In alternative embodiments, a cat's eye lens and a bank of corner cubes replace the corner cube.

11 Claims, 7 Drawing Figures

PSEUDO-BACKSCATTER LASER DOPPLER VELOCIMETER EMPLOYING ANTIPARALLEL-REFLECTOR IN THE FORWARD DIRECTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention relates generally to a laser Doppler velocimeter of the type used to measure a localized fluid velocity and, more particularly, to a laser Doppler velocimeter employing a reflector in the forward direction which reflects scattered radiation in an antiparallel direction back to a collector proximate a laser source.

2. Description of the Prior Art

Presently, laser Doppler velocimeters (LDV's) are used to optically measure the velocity of flow of a fluid. Such velocimeters can provide a dynamic measurement of flow velocity at a location within the fluid without requiring a probe or other structure to be disposed in, and hence disturbing, the flow. Basically, a laser velocimeter provides a velocity measurement of a fluid flowing along a path by focusing one or more coherent beams of laser light onto a point within a fluid stream containing particles having diameters of the order of the laser light wavelength. The movement of the flowing particles serves to "scatter" the light radiation by the Mie scattering process, and shift its wavelength by an amount dependent upon its velocity. Hence its wavelength is shifted by an amount dependent upon the velocity of the fluid. The described Doppler shifting of the wavelength is measured by various techniques to provide a measurement of the velocity of the particles.

One type of laser Doppler velocimeter is commonly referred to as the "dual scatter" type which provides a relatively high signal-to-noise ratio and a relatively high sensitivity compared to other instruments for measuring fluid velocity. Such a velocimeter generally includes a laser source providing a pair of parallel coherent beams which are focused to a crossing point at a location at which it is desired to measure the velocity of the fluid flow. A fringe field is formed at the beam crossing location due to beam interference in a manner well known to the art. As a particle within the fluid moves through the fringe field, the light intensity scattered therefrom is modulated at a frequency which is proportional to the scalar component of the velocity of such particle in a direction which lies in a plane normal to the bisector of the angle formed between the pair of beams at their point of incidence on the particle. Such Doppler shifted scattered light radiation is collected by a photo detector which provides a signal indicative of such velocity component.

A particular kind of dual-scatter velocimeter is the so-called confocal back-scatter on-axis velocimeter which uses a common lens for both the transmission of the output beams and collection of the back-scatter Doppler shifted radiation.

Another kind of dual-scatter velocimeter is one which includes a local oscillator which is capable of simultaneously generating signals representative of two components of the flow velocity in directions transverse to and along the transmitting axis of the system. In such a velocimeter a comparator is included for comparing the Doppler shifted wavelength of the radiation scattered by the particle from one of the two transmitted beams with the wavelength of such beam prior to the Doppler shift and for providing a signal indicative of a velocity component of the particle along the transmitting axis. This enables two separate scalar velocity components along known paths to be obtained with one velocimeter from which the path and speed of the particle in two-dimensional flow is able to be calculated.

Heretofore, the described LDV systems have performed satisfactorily in environments where the fluids have included a substantial number of particles so that backscatter techniques can be used and where the collector is able to be placed in a direction generally forward of the fringe field such that it collects the relatively strong forward scattered light. However, in the field of aeronautics where it is desired to measure the velocity of air at or near a given airfoil such LDV's have been unsatisfactory in view of the low backscatter obtained in air and in view of the problems encountered in maintaining alignment between a collector and a tranmitter when the object carrying the transmitter is moving.

For example, in an attempt to increase the concentration of particles in air so that the velocity of the air could be measured by backscatter techniques, a smoke screen is laid by an aircraft traveling in one direction to enhance the backscatter properties of the air. Such aircraft is then flown back through the smoke screen. This technique is not only operationally inconvenient but creates a turbulent environment which is dangerous for the aircraft and which disturbs the velocity to be measured.

Similar problems are encountered in wind tunnel applications in that the more convenient backscatter LDV systems generally provide inadequate signals while the forward scatter LDV systems require the alignment be maintained between the moving collector and the transmitter. It should also be noted that in some wind tunnel applications, the presence of large objects in the tunnel between the transmitter and the collector preclude the use of forward scatter systems.

Examples of prior art laser Doppler velocimeters are found in U.S. Pat. No. 3,519,356, "Ring Laser Flow Meter with Means to Compensate for Changes of Refractive Index of the Flowing Medium," Kroeger et al; U.S. Pat. No. 3,822,940, "Velocimeter", Goldfischer; U.S. Pat. No. 3,856,402, "Clear Air Turbulence Detector," Low et al; and U.S. Pat. No. 3,915,572, "Combined Dual Scatter Local Oscillator Laser Doppler Velocimeter," Orloff. However, none of these patents reveal a laser Doppler velocimeter having an antiparallel reflector in the forward direction.

SUMMARY OF THE INVENTION

It is therefore an object if the present invention to provide an improved laser Doppler velocimeter for measuring the velocity of a flowing fluid which includes the ability to retain the higher sensitivity of forward scatter systems, while achieving nearly the operational convenience of backscatter systems.

Still aother object of the present invention is to provide such a laser Doppler velocimeter which is able to be used on aircraft and in wind tunnels.

Briefly, the preferred embodiment includes a laser for providing first and second beams of collimated coherent monochromatic electromagnetic radiation which are focused to intersect at a predetermined location in a flowing fluid, the movement of the particles of the fluid serving to scatter the radiation in substantially all directions, the scattered radiation being shifted in frequency from that of the first bean by an amount corresponding to the velocity of the fluid at the predetermined location, a corner cube being responsive to a portion of the radiation scattered in the forward direction and operative to reflect the portion in a direction substantially antiparallel to the forward direcion, and a collector responsive of to the frequency of said first beam and to the frequency of the reflected portion of radiation and operative to provide a frequency modulated signal representative of the velocity of the fluid at the predetermined location.

Among the advantages of the present invention are its relatively high sensitivity, its operational convenience, the relaxation of the alignment requirements between the transmitter and the reflector and its capability of providing velocity measurements in air or wind tunnel environments.

These and other objects and advantages of the present invention will no doubt become apparent to those of ordinary skill in the art after having read the following detailed description of the preferred embodiments which are illustrated in several figures of the drawing.

IN THE DRAWING

DESCRIPTION OF THE PREFERRED EMBODIMENTS

Figure 1:
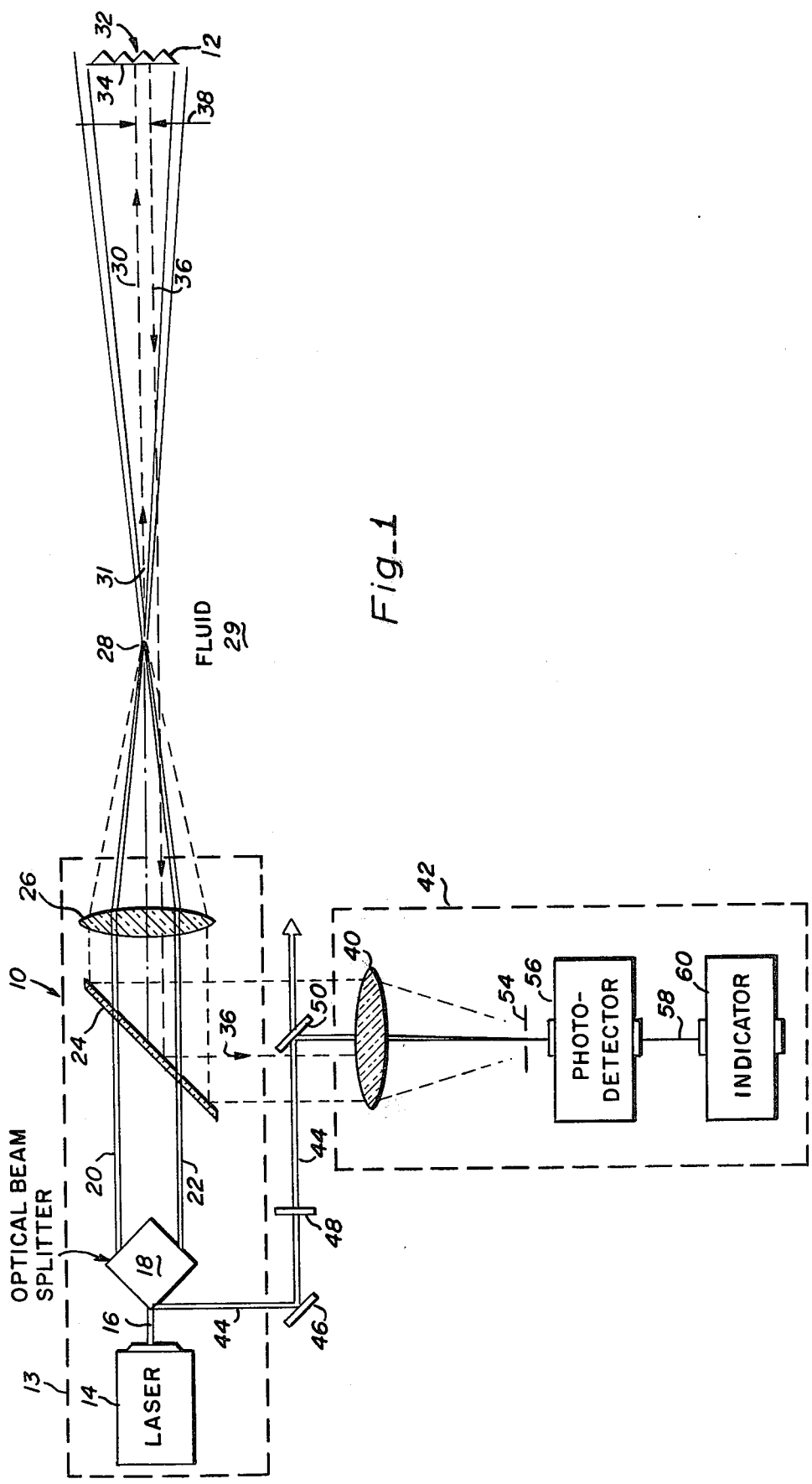
FIG. 1 is a schematic diagram of a laser Doppler velocimeter in accordance with the present invention.

Referring to FIG. 1 of the drawing, a laser Doppler velocimeter 10 in accordance with the present invention is illustrated in a schematic diagram. As shown herein, the velocimeter is a dual-scatter confocal, on-axis type and includes a corner cube lens 12. It should be recognized by those skilled in the art that such a velocimeter 10 employs a common lens for both transmission of the coherent beams which are focused onto a particle and for collection of reflected electromagnetic radiation from the corner cube 12. However, other dual-scatter velocimeters having a forward scatter, off-axis configuration can be utilized in the present invention.

The velocimeter 10 includes a light transmission means 13 for generating a pair of beams of electromagnetic radiation which are coherent with repsect to one another. More particularly, a laser 14, such as an argon laser, capble of emitting a continuous beam of light, directs its ouptut beam 16 of light radiation onto an optical beam splitting cube 18 which serves to divide the output beam of such laser into a pair of coherent beams 20 and 22 of monochromatic electromagnetic radiation. As illustrated, such beams pass through suitable transmission apertures within a mirror 24 for focusing by a convex lens 26 or the like to intersect at a predetermined location 28. The light transmitting means 13 should be positioned to place the location 28 at the point at which it is desired to measure the velocity of the particles within the fluid 29 along the path 31.

Figure 2:
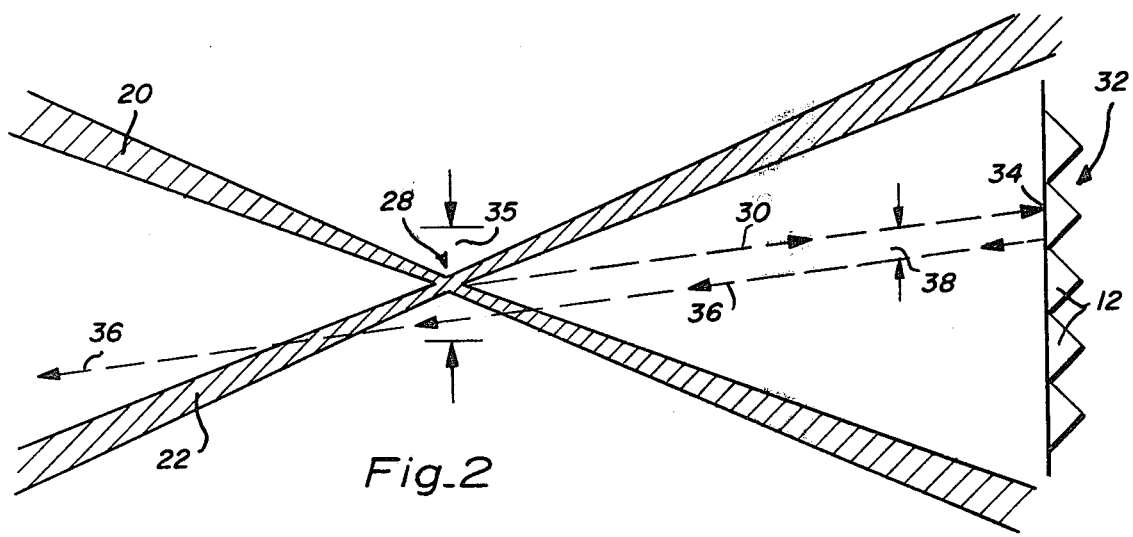
FIG. 2 is a diagramatic view schematically illustrating the optics of the preferred embodiment employing a corner cubelens.

Turning also to FIG. 2 because the beams 20 and 22 shown in cross-hatch are coherent, a fringe pattern is formed at the location 28. As the particle moves through such fringe pattern, it scatters the light in substantially all directions. However, the amplitude of the scatter light is not the same in all directions. In particular, the light scattered in the forward direction shown in dashed line and designed by the numeral 30 is much more intense than the light scattered in the back direction. This forward scattered ligh 30, as well as scattered light in the other directions, is caused to undergo a frequency shift in accordance with the well known Doppler principal by reason of the particle velocity. Thus, the forward scattered light is Doppler shifted and has an amplitude that varies with time, i.e., a frequency component, corresponding to a scalar componenet of the velocity of such particle.

The bank of corner cubes 12 formed into a mosaic pattern 32 are positioned forward of the intersection 28 within the region defined by the diverging beams 20 and 22 with their faces 34 lying in a plane that is generally normal to the forward scattered light. The corner cubes 12 serve to laterally offset the portion of the light which is scattered forwardly from the moving particles and to reflect it in a substantially antiparallel direction 36 as parallel wave fronts which pass through a slightly enlarged diameter 35 at the intersection location 28 and onto the mirror 24. In the preferred embodiment the face has a dimension of about one inch and the lateral offset 38 is less than the dimension of the face 34. The mirror 24 is oriented relative to such light to reflect the same through a collector, generaly designated by the numeral 42 including a collecting lens system, represented schematically by the convex lens 40 for focusing the light in the collector 42.

In order to compare the Doppler shifted wavelength of the radiation scattered from the beams 20 and 22 and the wavelength of such beams prior to such Doppler shift, a reference beam 44 is obtained as a spurious reflection of the output beam 16 from the splitter cube 18. The reference beam 44 has the same plane of polarization as the output beam 16 and is reflected by the mirror 46 so as to pass through a neutral density filter 48 and impringe on a low reflection mirror 50. The mirror 50 is positioned along the optical axis of the collecting lens 40 and serves to reflect a portion of the beam 44 into alignment with the scattered, Doppler shifted radiation 36 reflected from the corner lens 12.

Since the polarization of the beams 20 and 22 are the same as that of the reference beam 44, that portion of the beam 44 which is reflected into alignment with the Doppler shifted radiation will heterodyne with that portion of such radiation to provide a resulting light signal which is modulated at a frequency dependent upon the scalar component of velocity of the particle along the path of 31. As is illustrated, such resultant frequency modulated light signal passes through the light stop 54 and impinges on the collecting surface of a photodetector 56 having an output of 58, The photodetector 56 responds to the resultant light signal and produces an electrical signal on its output 58 that is representative of the velocity of the particles along the path 31. An indicator 60 is connected to the output 58 and serves to provide a visual display of the electrical signal.

It should be noted that the reference beam need only heterodyne with a small fraction of the reflected radiation to provide a sufficiently strong signal for adequate sensitivity in measuring the particle velocity. In a preferred embodiment, the mirror 50 is selected to reflect a small amount of the reference beam 44 and hence, transmit the remainder to the location 28.

Figure 3:
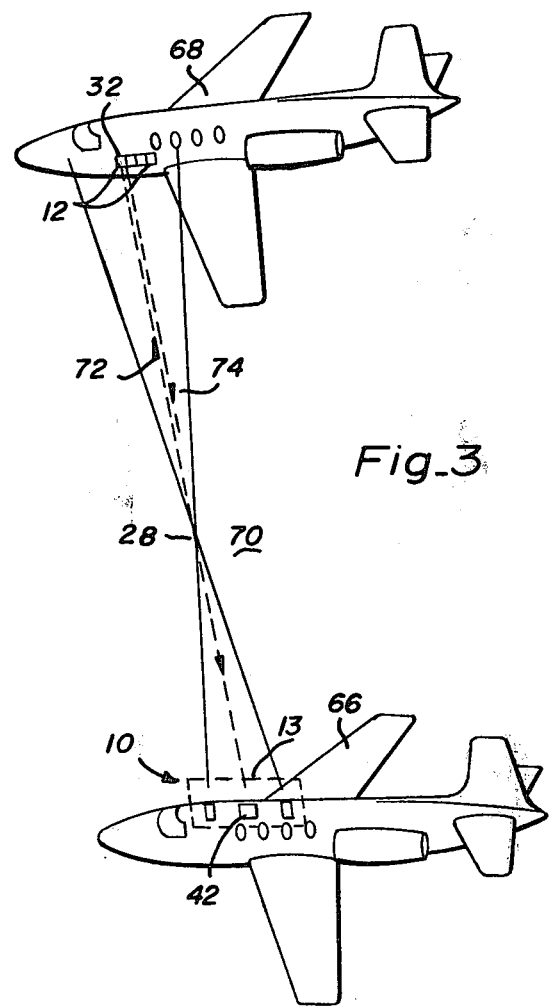
FIG. 3 illustrates the operation of the present invention employed on two aircraft.

Referring now to FIG. 3, a preferred application of the present invention is illustrated. As shown, the laser Doppler velocimeter 10 including the light transmitting means 13 and the collector 42 is mounted on the body of an aircraft 66. The bank of corner cubes 12 formed into the retromosaic pattern 32 are mounted on a facing surface of an aircraft 68.

In operation when the aircraft 66 and 68 are flown through the air space 70 at which it is desired to measure the particle velocity, the laser beams 20 and 22 are focused to intersect at the location 28 in the air space 70 between the aircraft 66 and 68. As previously describe the particles in the air flowing generally in the direction 72 scatter the light beams in all directions and provide relatively intense forward scattered radiation having a frequency that is Doppler shifted relative to the beams 20 and 22. Since the aircraft are arranged to fly in a generally predetermined flight pattern, such forward scattered radiation strikes the corner cubes 12 and is reflected therefrom in an offset and substantially antiparallel direction 74 into the light collector 42 serves to heterodyne the reflected Doppler shifted radiation with a portion of the reference beam 20 and to provide a signal at its output that corresponds to the velocity of the air at the intersecting location between the aircraft.

It should be noted that in this application the forward scattered and the reflected signals are strong enough so that the aircraft can be separated by relatively large distances during flight. Hence, the aircraft do not contaminate the air that is being measured. Moreover, the corner cubes 12 are capable of reflecting radiation incident at angles of between +60° and −60° relative to their optical axis. Consequently, the in-flight alignment requirements between the aircraft are not too rigid. In this embodiment it is preferred that the lenses 12 be positioned on the rear aircraft, although they may be positioned on the forward aircraft.

Figure 4:
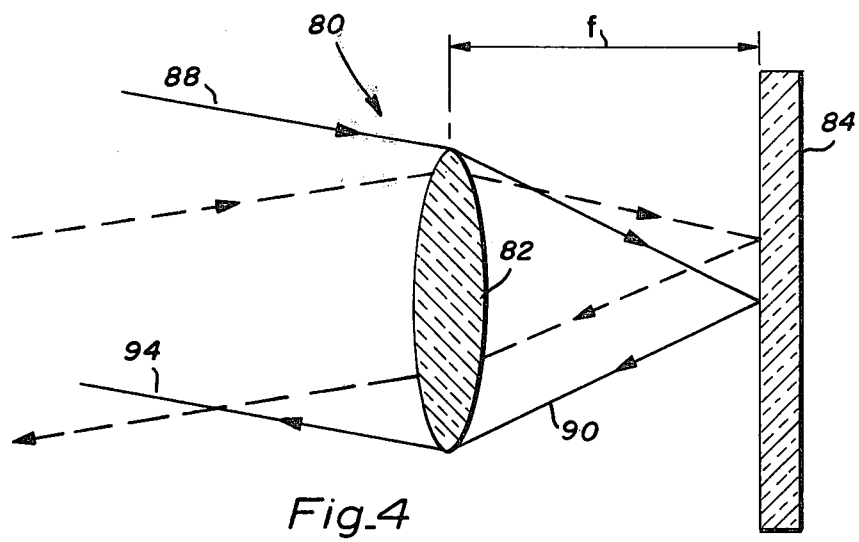
FIG. 4 is a schematic diagram of a second embodiment of the reflector and its associated optics.
Figure 5:
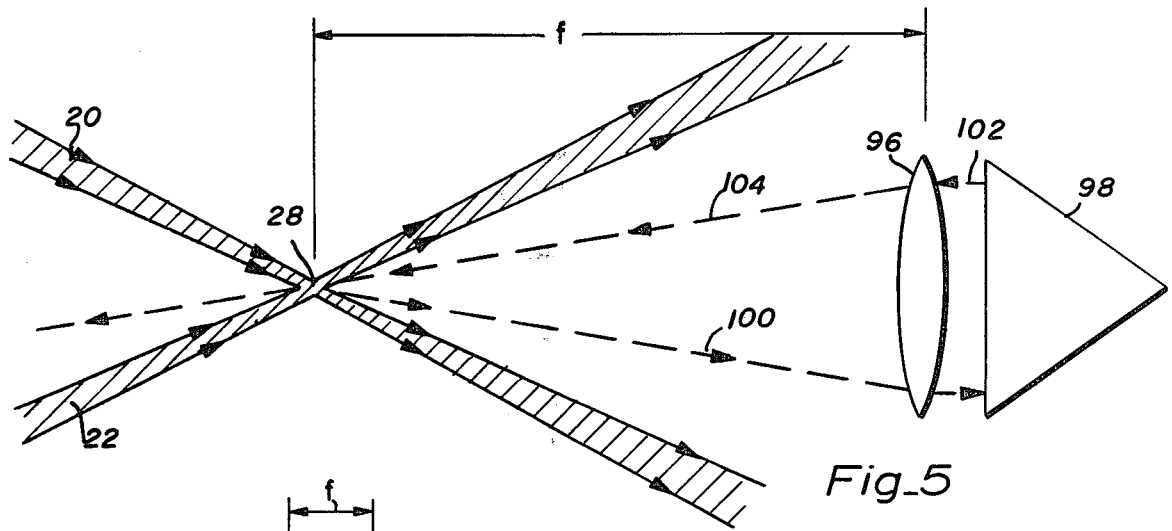
FIG. 5 is a schematic diagram of a third embodiment of the reflector.
Figure 6:
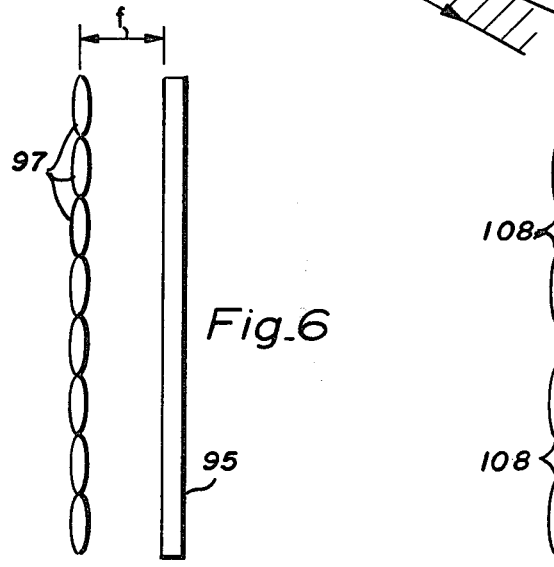
FIGS. 6 and 7 are schematic diagrams of arrayed embodiments of reflectors in accordance with the present invention.

Referring now to FIGS. 4–7, alternative embodiments of reflectors in accordance with the present invention are illustrated. In use the reflectors replace the bank of corner cubes illustrated in FIGS. 1 and 2. With reference to FIG. 4, a cat's eye lens configuration 80 is illustrated. The cat's eye lens 80 comprises a convex lens 82 and a mirror 84 positioned one focal length to the rear of the lens 82. In the cat's eye 80, forward scattered light 88 passes through and is focused by the lens 82 onto the mirror 84. Such light is reflected by the mirror 84 as indicated by the path 90. When such reflected light passes through the lens 82, it is focused along a path 94 that is antiparallel to and laterally offset from the incident path 88. The offset dimension is less than that of the diameter of the lens 82. FIG. 6 illustrates a linear array of cat's eye lens configurations in which a mirror 95 is disposed a focal length behind a bank of convex lenses 97. In operation, the laser Doppler velocimeters employing such cat's eye lens configurations are identical to that previously described.

Figure 7:
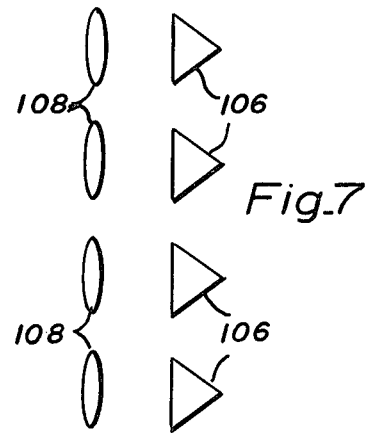

Turning now to FIG. 5, the reflector comprises a converging lens 96 disposed in front of the corner lens 98. In this embodiment the intersection location 28 shouls be determined such that the lens 96 is forward from it by a distance about equal to about the focal length, $f$, of the lens 96. As illustrated, the forward scattered light 100 is focused by the converging lens 96 into the corner lens 98 which reflects it in an antiparallel direction 102. The reflected scattered radiation then passes through and is focused by the converging lens 96. Since the reflector is positioned a focal length from the intersection location 28, the reflected radiation is returned along the path 104 through the intersection location 28 to the collector system (not shown). Accordingly, the reflected scattered light will appear to the collector as backscattered light originating at the location 28 is a conventional laser Doppler velocimeter system. In FIG. 7, the reflector comprises an array of corner lenses 106 and converging lenses 108, similar to the configuration illustrated in FIG. 5. The operation of these embodiments is the same as that previously described.

It should be recognized that the laser Doppler velocimeters of the present invention can be employed to measure the velocity of fluid flow in wind tunnel enviroments wherein the reflecting lenses are disposed on a wall of the tunnel opposite the light-transmitting means.

From the above, it will be seen that there have been provided improved laser Doppler velocimeters which fulfill all of the objects set forth above.

While the invention has been particularly shown and described with reference to certain preferred embodiments, it will be understood by those skilled in the art that various alterations and modifications in form and detail may be made therein. Accordingly, it is intended that the following claims cover all such alterations and modifications as fall within the true spirit and scope of the invention.

What is claimed is:

1. A laser Doppler velocimeter for measuring the velocity of a fluid comprising:
   first means for providing first and second beams of collimated coherent monochromatic electromagnetic radiation which are focused to intersect at a predetermined location, whereby when said predetermined location is situated in a flowing fluid the movement of the particles of the fluid scatters the radiation in substantially all directions, the scattered radiation having a frequency that is shifted from that of said first beam by an amount corresponding to the velocity of the fluid at said predetermined location;
   second means disposed generally forward of said predetermined location being responsive to a portion of the radiation scattered in the forward direction and operative to reflect said portion in a direction substantially antiparallel to said forward direction; and
   third means responsive to the frequency of said first beam and to the frequency of said reflected portion of radiation and operative to provide a frequency modulated signal representative of the velocity of the fluid at said predetermined location.

2. A laser Doppler velocimeter as recited in claim 1 wherein said second means comprises at least one corner cube responsive to a portion of said forward scattered radiation and operative to laterally offset said portion and reflect same in a direction substantially antiparallel to said forward direction.

3. A laser Doppler velocimeter as recited in claim 2 wherein said at least one corner cube includes a face lying in a plane generally normal to said forward scattered radiation.

4. A laser Doppler velocimenter as recited in claim 1 wherein said second means comprises a generally convex lens responsive to radiation and operative to focus said radiation, and a corner cube having a face and being disposed slightly forward of said convex lens, said corner cube serving to reflect radiation passing through its face in a substantially antiparallel direction and offset same a distance less than the dimension of said face, whereby the portion of said forward scattered radiation passing through said convex lens and directed onto said face is reflected by said corner cube in said substantially antiparallel direction and whereby said convex lens focuses the reflected radiation toward said third means.

5. A laser Doppler velocimeter as recited in claim 4 wherein said convex lens has a focal length substantially equal to its distance from said predetermined location such that said reflected radiation passes through said predetermined location.

6. A laser Doppler velocimeter as recited in claim 1 wherein said second means comprises a converging lens having a characteristic focal length and a mirror disposed forward of said converging lens by a distance substantially equal to said focal length.

7. A laser Doppler velocimeter as recited in claim 1 wherein said second means comprises a plurality of converging lenses, each having a substantially identical focal length, and a mirror disposed forward of said plurality of converging lenses, said converging lenses being arranged such that said mirror is spaced therefrom by a distance substantially equal to said focal length.

8. A laser Doppler velocimeter as recited in claim 1 wherein said first and said third means are mounted on a first body, and said second means is mounted on a second body such that it is capable of responding to said forward scattered radiation, said first body being movable relative to said second body whereby a predetermined amount of relative movement between said first and second bodies does not adversely affect the operation of said laser Doppler velocimeter.

9. An airborne laser Doppler velocimeter system for measuring the velocity of air comprising:
  a first aircraft carrying first means for providing first and second beams of collimated coherent monochromatic electromagnetic radiation which are focused to intersect at a predetermined location in the air and second means responsive to a portion of said first beam and to reflected radiation and operative to provide a frequency modulated signal representative of the velocity of the air at said predetermined location; and
  a second aircraft for flying in a direction generally forward of said predetermined location, said second aircraft carrying third means for reflecting radiation in a generally antiparallel direction, whereby when said first and second aircraft are flown with said predetermined location situated therebetween, the movement of the particles of the air at said predetermined location scatters the radiation in substantially all directions, the scattered radiation having a frequency that is shifted from that of said first beam by an amount corresponding to the velocity of the air at said predetermined location and whereby said third means reflects a portion of said forward scattered radiation in said antiparallel direction to said second means which provides said frequency modulated signal.

10. A laser Doppler velocimeter as recited in claim 1 wherein said third means comprises at least one corner cube responsive to a portion of said forward scattered radiation and operative to laterally offset said portion and reflect same in a direction substantially antiparallel to said forward direction.

11. A laser Doppler velocimenter as recited in claim 1 wherein said third means comprises a generally convex lens responsive to radiation and operative to focus said radiation, and a corner cube having a face and being disposed slightly forward of said convex lens, said corner cube serving to reflect radiation passing through its face in a substantially antiparallel direction and offset same a distance less than the dimension of said face, whereby the portion of said forward scattered radiation passing through said convex lens and directed onto said face is reflected by said corner cube in said substantially antiparallel direction and whereby said convex lens focuses the reflected radiation toward said second means.

* * * * *